UNITED STATES PATENT OFFICE.

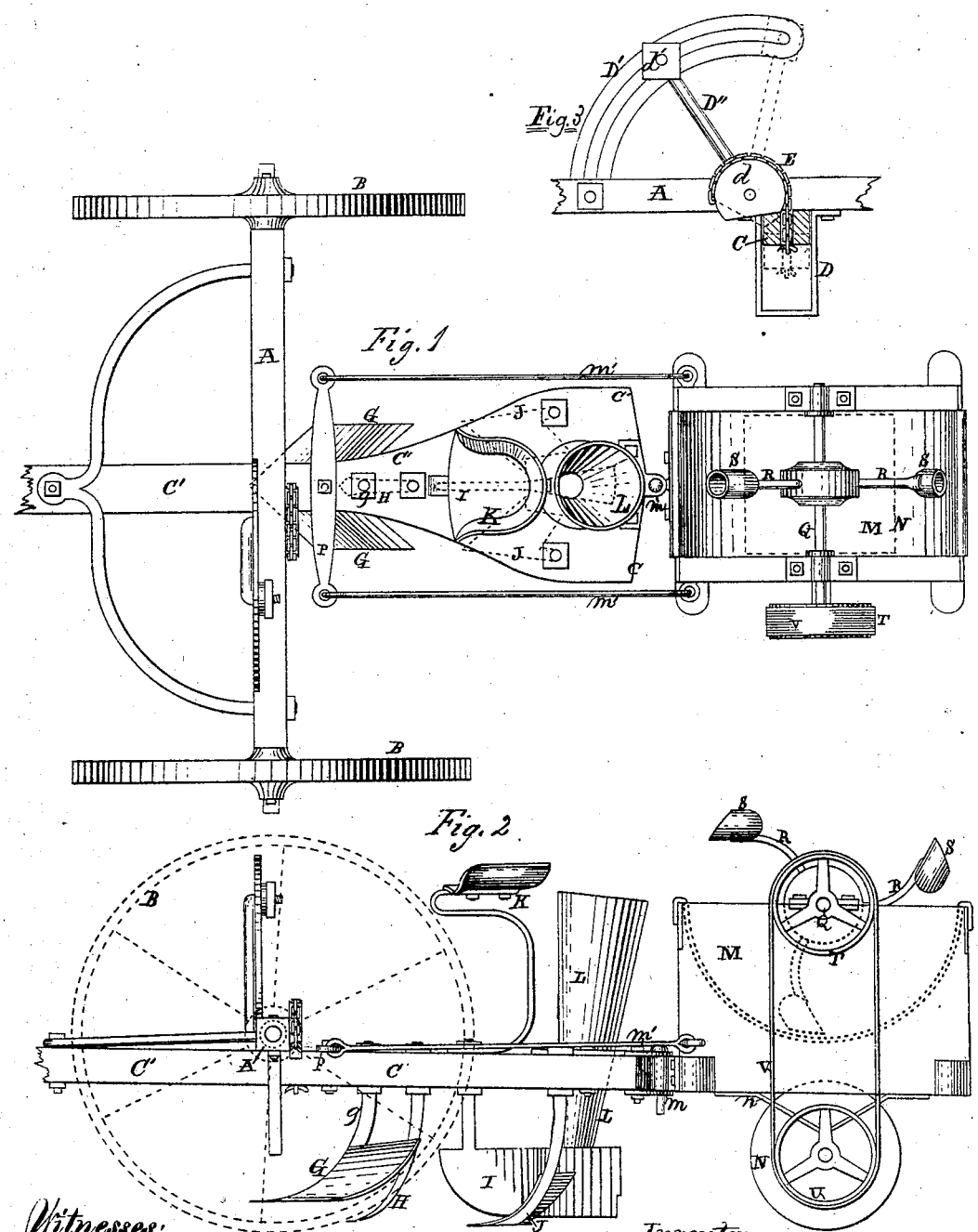

STEPHEN DIXSON, OF ROSEVILLE, ILLINOIS.

IMPROVEMENT IN CORN-PLANTERS.

Specification forming part of Letters Patent No. 135,098, dated January 21, 1873.

*To all whom it may concern:*

Be it known that I, STEPHEN DIXSON, of Roseville, in the county of Warren and State of Illinois, have made certain Improvements in Corn-Planters, of which the following is a specification:

Nature and Objects of the Invention.

The nature of my invention relates to improvements in machines for preparing the ground and planting corn at one operation; and the invention consists, first, in an arrangement of plows, adjustably attached to an axle and wheels, for preparing the soil, all as hereinafter fully described; second, in the arrangement of a spout and shoe to receive and place the corn in a drilled row in combination with the aforesaid plows, all as hereinafter fully described; third, in the construction of the dropping or distributing device, and its combination with the aforesaid parts, all as hereinafter fully described.

Description of the Accompanying Drawing.

Figure 1 is a top plan or view of a machine embodying my invention; Fig. 2 is a side elevation; and Fig. 3 is a detached view of the depth-regulating device for the plows.

General Description.

A represents the axle, and B B its supporting-wheels. C is a bar, adjustably attached to the axle, as hereinafter described, which, extending forward of the axle, forms the draft-pole C', and rearward forms the support for the plows, driver's seat, chute, shoe, and attachment for the roller and distributing device. D is a staple. D' is an arc of a circle. D'' is a crank, one end passing through the axle A and carrying a pulley, $d$, and the other end turned and passed through a slot in the arc D', where it may be adjusted by a nut, $d'$. E is a chain or cord, one end attached to and passed over the pulley $d$, and the other end attached to the bar C. It will be evident, from an inspection of Fig. 3, that the bar C may be raised and lowered relatively to the axle A by oscillating the crank D'', while the staple D will hold it secure laterally. G is the forward plow, consisting of a double mold-board, and rather flat in form, so that it will run very shallow and clean off the surface, and it is attached to the bar C by a shank, $g$. H is a cutter or opener for the shoe I. The cutter H is just in rear of the plow G and just forward of the shoe I. J J are two plows, one on each side of the shoe I, and arranged to loosen up the soil and turn it in a ridge against the forward part of the shoe I. K is the driver's seat, mounted on the bar C. L is a spout or receiver for the corn, funnel-shaped, extending above the bar C to receive the corn, and below it to lead it to the open rear end of the shoe I. M is the seed-box, hinged to the bar or beam C at $m$, and supported on a roller, N, which is provided with suitable bearing in brackets $n\ n$. The seed-box M is also connected to the bar C by rods $m'\ m'$, which extend forward from each side of the seed-box, and are attached at their forward ends to an evener, P. Q is a shaft extending across the upper part of the seed-box M, and provided with suitable bearing thereon. R R R are radial arms from the central part of the shaft Q. S S S are small cups on the outer ends of the arms R, and formed and arranged as shown in the drawing, so that they will lift the seed or corn as the shaft Q is rotated and discharge it into the spout or duct L, the radial arms and seed-cups at the same time stirring and agitating the seed, and thereby obviating the necessity for any other or additional stirring device. T is a pulley on the outer end of the shaft Q, and U is a pulley on the outer end of the shaft of the roller N, and V is a band connecting them.

The operation of my invention is as follows: As the machine is drawn forward the plow G will remove the surface soil, and with it the grass and weed seeds, and the plows J J will loosen up the lower soil and form a ridge, which will be opened by the shoe I, and the seed deposited therein by the cups S and duct L, the roller N serving to cover the seed in passing over, to support the seed-box, to regulate the depth of penetration of the plows, and to operate the shaft Q. The plows J J, in addition to forming a loose ridge, also serve to steady the running and hold the forward plow G with its lower side horizontal. The corn will be deposited in drills, and may, in this manner, be planted earlier than usual, and the soil between the rows be cultivated or plowed while the corn is growing, and the surface soil being removed from the row, and with it the weed and grass seeds, will allow the corn to get the start of the weeds; and, in fact, keep the row clean, which is the great difficulty in drilled corn.

*Claims.*

1. The combination of plows G J J, cutter H, and shoe I for preparing the soil for the reception of the seed, in manner specified.

2. The combination of plows G J J, cutter H, and shoe I, duct L, seed-box M, cups S, and roller N, when arranged for joint operation, in manner set forth.

STEPHEN DIXSON.

Witnesses:
 H. CHRISMAN,
 P. R. RICHARDS.